US012600151B2

(12) United States Patent
De Marco et al.

(10) Patent No.: US 12,600,151 B2
(45) Date of Patent: Apr. 14, 2026

(54) CUTTER AND METHOD OF SEPARATION FOR SHEETS PRINTED FROM A CONTINUOUS WEB SUSCEPTIBLE OF LONGITUDINAL DIVISIONS AND RELATIVE WEB

(71) Applicant: TECNAU S.r.l., Ivrea (IT)

(72) Inventors: Giuliano De Marco, Ivrea (IT); Emanuela De Marco, Ivrea (IT)

(73) Assignee: Tecnau S.r.l., Ivrea (IT)

( * ) Notice: Subject to any disclaimer, the term of this patent is extended or adjusted under 35 U.S.C. 154(b) by 370 days.

(21) Appl. No.: 18/130,527

(22) Filed: Apr. 4, 2023

(65) Prior Publication Data

US 2023/0322002 A1 Oct. 12, 2023

(30) Foreign Application Priority Data

Apr. 6, 2022 (IT) ........................ 102022000006800

(51) Int. Cl.
*B41J 11/66* (2006.01)
*B41J 11/70* (2006.01)

(52) U.S. Cl.
CPC .............. *B41J 11/663* (2013.01); *B41J 11/70* (2013.01)

(58) Field of Classification Search
CPC . B41J 11/66; B41J 11/663; B41J 11/68; B41J 11/70; B41J 11/706; B41J 15/00; B41J 11/0095
See application file for complete search history.

(56) References Cited

U.S. PATENT DOCUMENTS 4,477,103 A * 10/1984 Bertolazzi ................ B41J 11/46 462/2
2003/0107640 A1* 6/2003 Chang .................... B41J 11/008 347/107
2011/0283855 A1* 11/2011 Kwarta ................ B26D 7/2635 83/499
2013/0057930 A1 3/2013 Toki
2018/0200906 A1* 7/2018 Senoo .................... B26D 5/007

FOREIGN PATENT DOCUMENTS

EP 0554989 A1 8/1993
EP 1602501 A2 12/2005

* cited by examiner

*Primary Examiner* — Scott A Richmond
(74) *Attorney, Agent, or Firm* — Loginov & Associates, PLLC; William A. Loginov

(57) ABSTRACT

Separator cutter for printed sheets from a continuous paper web provides multiple longitudinal divisions of different working sections with a series of single or adjacent sheets. The sheets have respective print areas with texts and/or images, while the cutter includes margining knives and longitudinal dividing knives and an electronic control unit. The cutter operates with webs wherein, at the beginning of each working section, a printed image mark (Print mark) is placed at a distance of the print area and automatically sets margins and division cuts based on a corresponding working section. The cutter includes servo mechanisms for displacement of the margining and longitudinal dividing knives and a sensor for the Print mark. In response to a new working section, the servo mechanisms is activated by positioning the knives in transverse positions based on data from the new working section and referencing the transverse position of the Print mark.

11 Claims, 6 Drawing Sheets

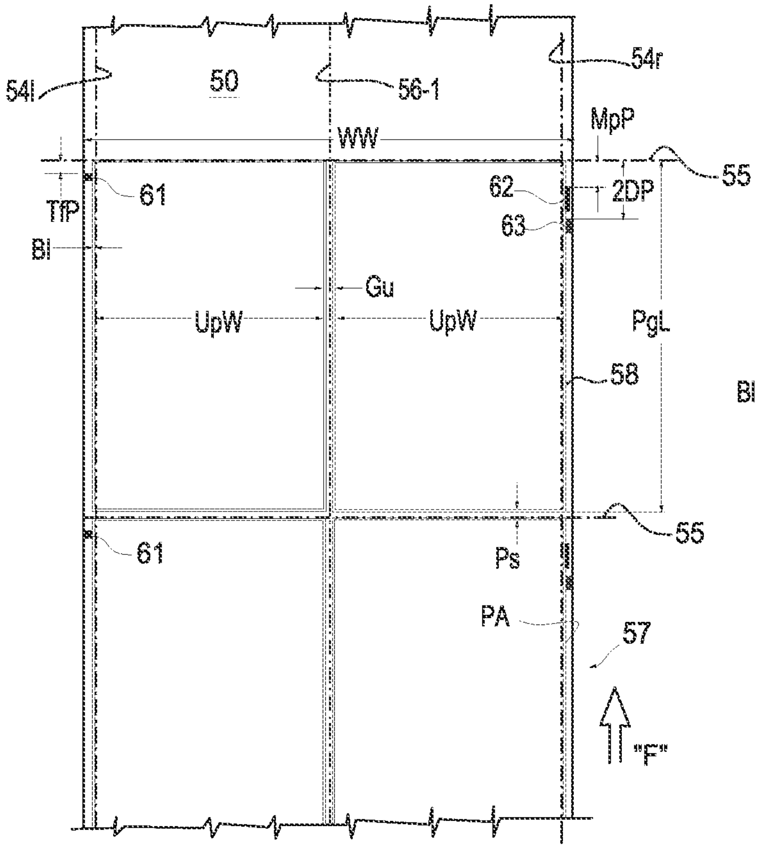
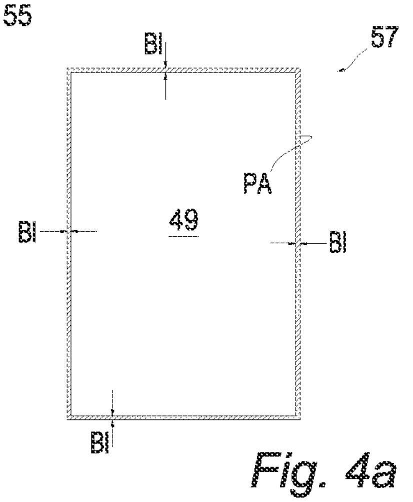
Fig. 4a
Fig. 4
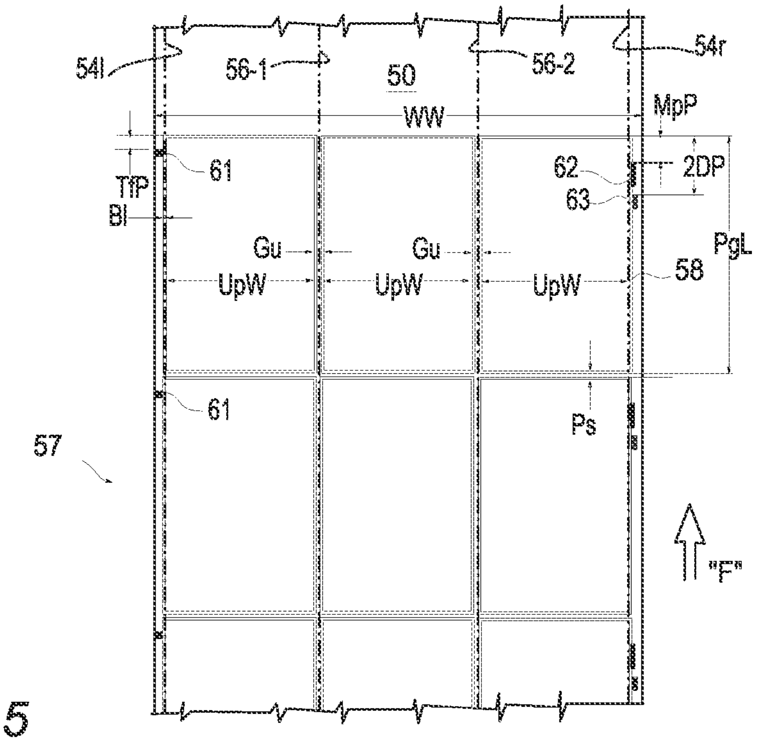
Fig. 5

CUTTER AND METHOD OF SEPARATION FOR SHEETS PRINTED FROM A CONTINUOUS WEB SUSCEPTIBLE OF LONGITUDINAL DIVISIONS AND RELATIVE WEB

RELATED APPLICATIONS

This application claims priority to Italian Application No. 102022000006800 filed on Apr. 6, 2022, and entitled "CUTTER AND METHOD OF SEPARATION FOR SHEETS PRINTED FROM A CONTINUOUS WEB SUSCEPTIBLE OF SEVERAL LONGITUDINAL DIVISIONS AND RELATIVE WEB", the content of which is incorporated herein by reference in its entirety.

FIELD OF THE INVENTION

The present invention relates to a cutter and a method for separating sheets printed from a continuous paper web, which can be subjected to several longitudinal divisions and the relative web.

More specifically, the invention relates to a longitudinal and transversal separation cutter for sheets printed from an entering continuous unwinding paper web, wherein said web is susceptible of several longitudinal divisions and defines different working sections with a series of single sheets or side-by-side sheets to be separated, wherein the sheets have a respective print area with texts and/or images and the cutter comprises margining knives and longitudinal dividing knives which can be positioned transversally on the basis of sheet setting data of a respective working section.

The invention also relates to a method for longitudinal and transversal separating printed sheets from a continuous unwinding web, wherein the web is susceptible of longitudinal divisions and defines different working sections comprising a series of single sheets or side-by-side sheets to be separated, wherein the sheets have respective text and/or image print areas and wherein said method is applied to a cutter which comprises margining knives and longitudinal dividing knives which can be positioned transversally on the basis of sheet setting data of a respective working section.

The invention further relates to a continuous printed web, susceptible of several longitudinal divisions and different working sections, each section having a series of single sheets or side by side sheets, which are separable by a cutter and present respective text and/or image areas.

BACKGROUND OF THE INVENTION

A separation cutter of the type defined above, commercially known, comprises margining knives and longitudinal dividing knives, as well as a transversal cutting device. The margining knives and longitudinal dividing knives provide longitudinal cuts for the lateral margins and for the longitudinal divisions and a transversal cutting device provides for the transversal cuts of the paper web. The cutter is very fast and gives the possibility to separate from the web sheets of different sizes and with different overlaps and which can be used for manufacturing book blocks and booklets well-designed and which do not require final trimmings. However, the number and width of the overlaps must be set manually, by selecting the required longitudinal dividing knives and placing them in the desired transversal positions. If necessary, the positions of the margining knives must also be set manually and with accurate tests so that the text and/or image print areas appear, with respect to the margins and edges of the separate sheets, in the setting positions defined by the printing program.

Manual interventions are required due to the fact that the pages of the sheets are printed side-by-side and in close proximity on a full-width web. Current printers print the text and images in print areas which are referenced with respect to the physical margins of the printer itself, rather than the margins of the web. Consequently, the separation cutters cannot guarantee that the edges of the web are at the same positions as margins during the printing step. This creates a possibility of error in the positioning of the knives, which can result in the presence of white bands in pages with images cut in vivo or the image of a page trespassing into the contiguous page.

When a working section with a certain number of divisions for "UP" overlaps is followed by a working section with a different number of overlaps and/or different margins, the cutter must be stopped at the end of the current work and the longitudinal dividing knives and margining knives must be reset by conducting tests to verify the correctness of the settings. This process requires the intervention of an operator for approximately 10-15 minutes. Additionally, stopping and restarting the cutter results in advancement of tens of meters of blank web, which cannot be used for printing and must be discarded, resulting in obvious waste.

SUMMARY OF THE INVENTION

An object of the present invention is to provide a fast and reliable separation cutter, for sheets printed from a unwinding continuous paper web and the relative method ensuring the possibility of rapidly changing the formats of the sheets to be separated and in particular the number and positions of the longitudinal dividing cuts, with an automatic positioning of the margins and edges with respect to the text and/or image print areas, in exact correspondence with what is defined in the print program. This object is achieved by the separation cutter, of the type specified above, which can operate with paper webs wherein, at the beginning of each working section, an image mark (Print Mark) is printed at a predetermined transversal distance from the text and/or image print area of the sheets of the respective working section and wherein the margin and longitudinal dividing knives are arranged in transversal positions corresponding to the sheet setting data of the new working sector and with reference to the transversal position of the Print Mark.

The longitudinal and transversal separation method for sheets printed from a continuous paper web, as set forth above, employs a cutter that can operate with webs wherein, at the beginning of each working section, an image mark (Print Mark) is printed at a predetermined transversal distance from the text and/or image areas of the sheets of the respective working section, the cutter comprises margining knives and longitudinal dividing knives which can be positioned transversally on the basis of sheet setting data of a respective working section; shifting servomechanisms for the margining knives and the longitudinal dividing knives; a transversal-scanning sensor for the Print Mark and wherein, upon detection of new setting data, the above separation method provides a series of steps comprising:

a) detecting the transversal position of the print mark by means of the transversal scanning sensor;
b) activating the shifting servomechanisms by arranging the margining knives and the longitudinal dividing knives into transversal positions corresponding to the sheet setting data of the new working section and reference to the transversal position of the print mark;

c) executing the longitudinal divisions on the single sheets or on the side-by-side sheets of the new working section on the basis of the new sheet setting data; and d) activating the transversal cutting device for the transversal cutting of the sheets.

The previously specified web has at the beginning of each working section an image mark (Print Mark) printed at a predetermined transversal distance from a reference margin of the text and/or image print area and can be used in a cutter in which the margining knives and longitudinal dividing knives are susceptible to transversal movement on the basis of sheet set data and further comprising a sensor with transversal scanning for the Print Mark and in which the positions of the margining knives and longitudinal dividing knives are referred to the transversal position of the Print Mark.

BRIEF DESCRIPTION OF THE DRAWINGS

The characteristics of the invention will become clear from the following description, given by way of non-limiting example, with the aid of the attached drawings, wherein:

FIGS. 4 and 4*a* show selected details of a web used by the cutter of the invention;

FIG. 5 shows other details of the web of FIG. 4;

DETAILED DESCRIPTION

Figure 1:
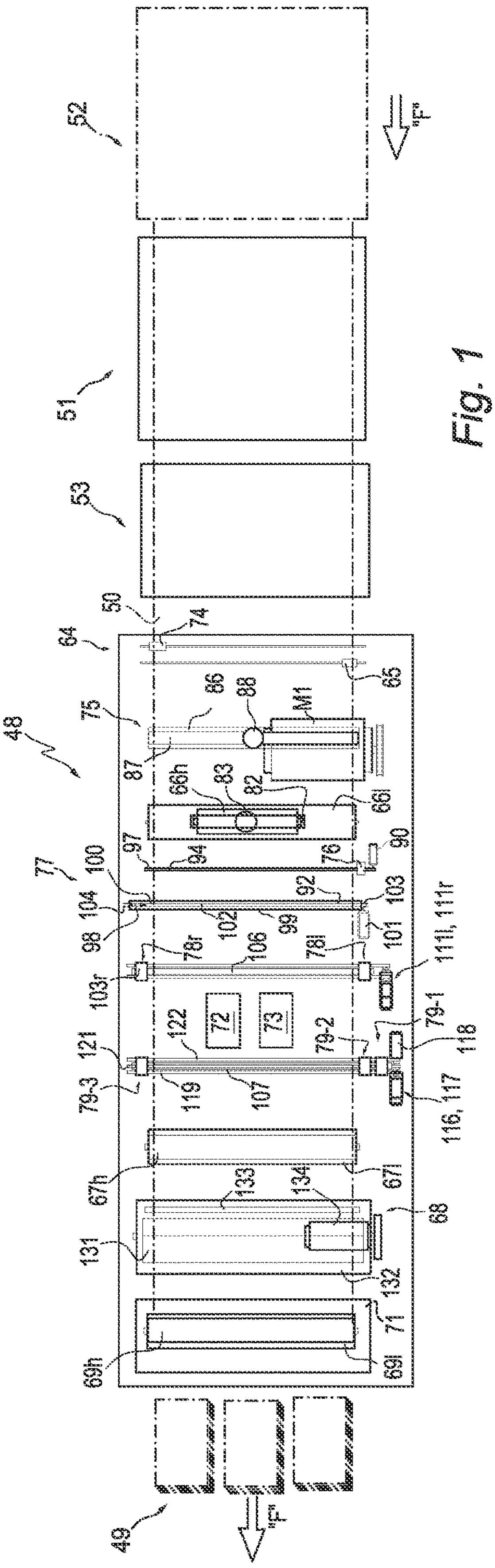
FIG. 1 shows a plan diagram of a separation equipment or cutter for sheets printed from a paper web, according to the invention.

With reference to FIG. 1, a separation equipment or cutter 48 is shown, according to the invention, for sheets printed 49 from a continuous paper web 50, entering along a direction “F”.

The cutter 48 is fed by a printer 51 which uses the web 50 unwinding from a virgin web roll 52. Upstream of the cutter there is a buffer unit 53 that accumulates and releases the web, compensating for the difference in speed between the web emerging from the printer and the speed of the web entering the cutter.

Figure 1A:
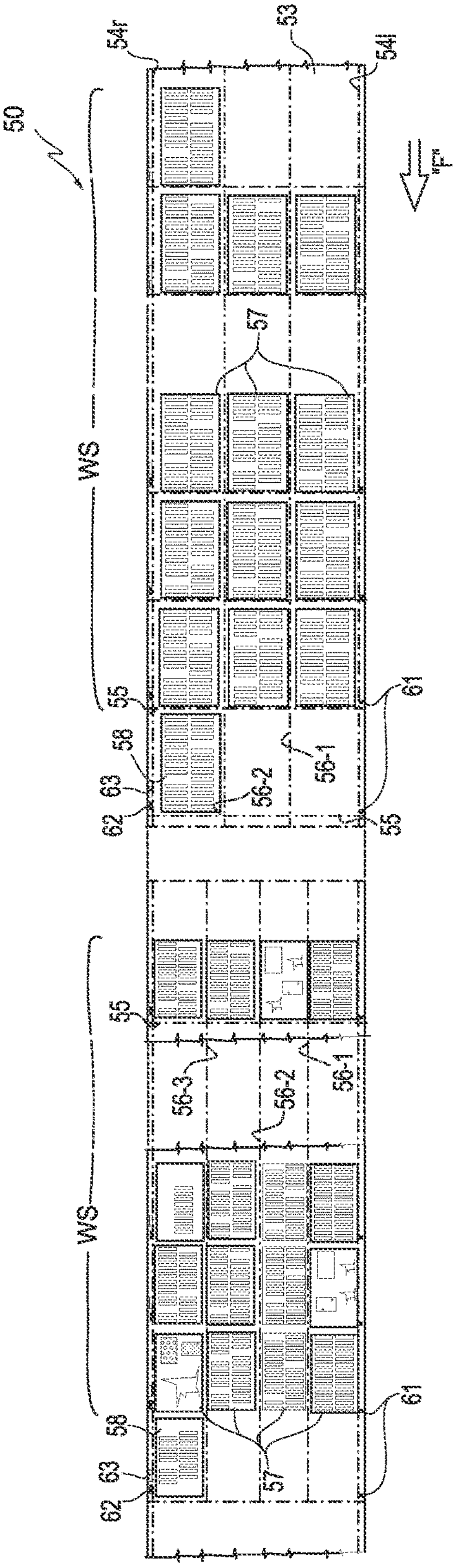
FIG. 1*a* show an exemplary paper web in accordance with FIG. 1.

The paper web 50 (FIG. 1*a*) is susceptible of trimming cuts 541 and 54*r* at the edges, transversal cuts 55 and longitudinal divisions 56, specifically 56-1, 56-2 and 56-3. It defines, along its extension, different working sections WS with a series of side-by-side sheets 57 to be separated, both transversally relative to the leading edges of the sheets, and longitudinally and which are overlapped at the output of the cutter 48, defining the sheets 49.

Based on the longitudinal divisions, the number of overlaps (UP) is indicated by 1UP (no division), 2UP (one division), 3UP (two divisions) and 4UP (three divisions). In the undivided web 50, the printer 51 prints the texts and images of the working sections WS in respective print areas PA (FIG. 4*a*) on the two faces of the sheets 57. The print areas PA include text and images, as well as blank edges for sheets with blank edges and the entire area for borderless sheets. The cutter 48 can also perform bleeds Bl on the sides of the sheets 57 (FIG. 4) in the print areas PA. This allows the overlapped sheets 49 to be used without further finishing cuts for forming booklets, book blocks and similar products.

In one embodiment of the invention, the set of sheets 57 of each working section WS is preceded by one or more respective work header sheets (Header page) 58 of a format similar to that of the other sheets 57. In addition, each single sheet (1UP) or each side by side sheet (2 to 4) 57, 58 has a graphic mark (TOF mark) 61 at its top.

The TOF marks 61 (FIGS. 4 and 5) are each printed close to the upper margin and a side, for example conventionally a left side, of the web 50 in the figures, at a distance TfP from the leading edge of the sheet in an area outside the print area, intended to be removed as a result of the trimming cuts.

On each Header page 58, also printed are an image mark (Print mark) 62, reference for longitudinal divisions, and a 2D code 63 with sheet setting data regarding the sheets 57 to be separated.

The Print mark 62 is printed near the upper edge and an edge, for example conventionally right, of the web 50, downstream and at a fixed distance with respect to the TOF mark 61.

The Print mark 62 is of elongated rectangular shape, side by side and at a predetermined transversal distance (for example tangent to an inner side thereof) with respect to a lateral edge of the print areas PA. The mark 62 defines a precise reference for the trimming and longitudinal cuts, not related to the current transversal position that the entering web can assume on the cutter 48. In the Header pages 58, the mark 62 is then outside the print area PA, at a distance MpP from the leading edge of the sheet, and it is also intended to be removed with the trimming cuts.

The 2D code 63 is printed near an edge, for example right of the web 50, outside the print area PA, at a distance MpP from the edge of the Header pages 58, downstream of the Print mark 62. The 2D code 63 and, optionally, the Print mark 62 are also printed on each sheet or side by side sheets 57 in positions corresponding to those of the Header pages 58.

With reference to FIGS. 4 and 5, the sheet setting data relate to information about: paper web width WW, sheet length PgL, width of each overlap UPW, bleed Bl (live space around the page), gap between the pages Gu (Gutter cut) and number of overlaps (UP). The sheets or side by side sheets 57 are also longitudinally spaced by a separation space Ps.

The 2D code 63 also comprises other information for optimized operation of the cutter 48, for example: condition of presence of the Header page 58; identification data of the current working section WS; number of the current page; total number of pages and, optionally, condition of presence of a last page and with possibility of adding other data.

The following description relates to a cutter of the above type which, for the execution of the trimming cuts and longitudinal divisions, uses margining knives and longitudinal dividing knives with rotating discs above and below the web path. The knives are driven by a single drive shaft and a drive train which is arranged between the discs downstream of the splitting area. Therefore the knives can be transversally displaced along free areas of the web only after arresting and transversal sectioning of a new working section.

Figure 2:
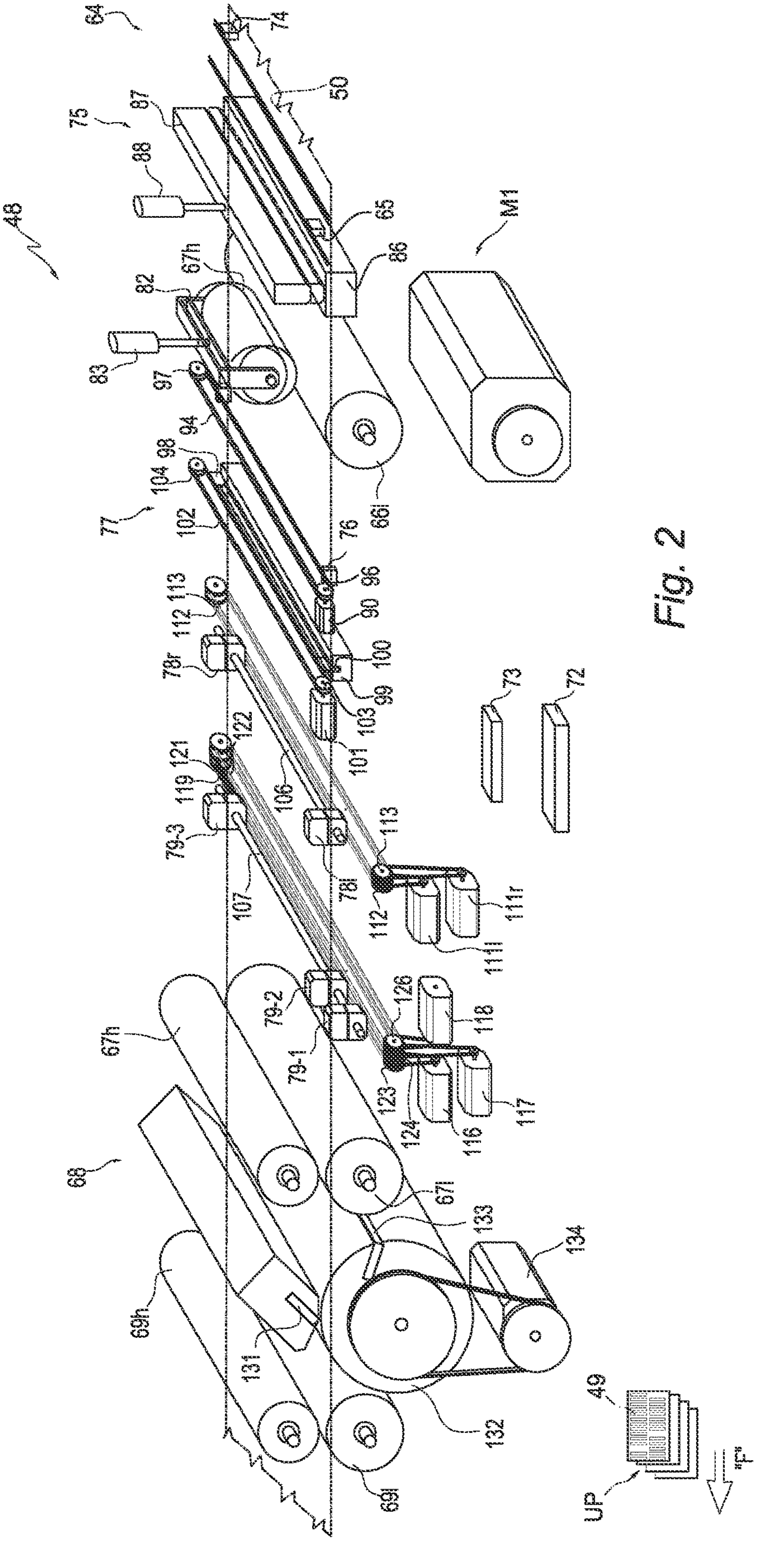
FIG. 2 shows a perspective view of the cutter according to the invention.
Figure 3:
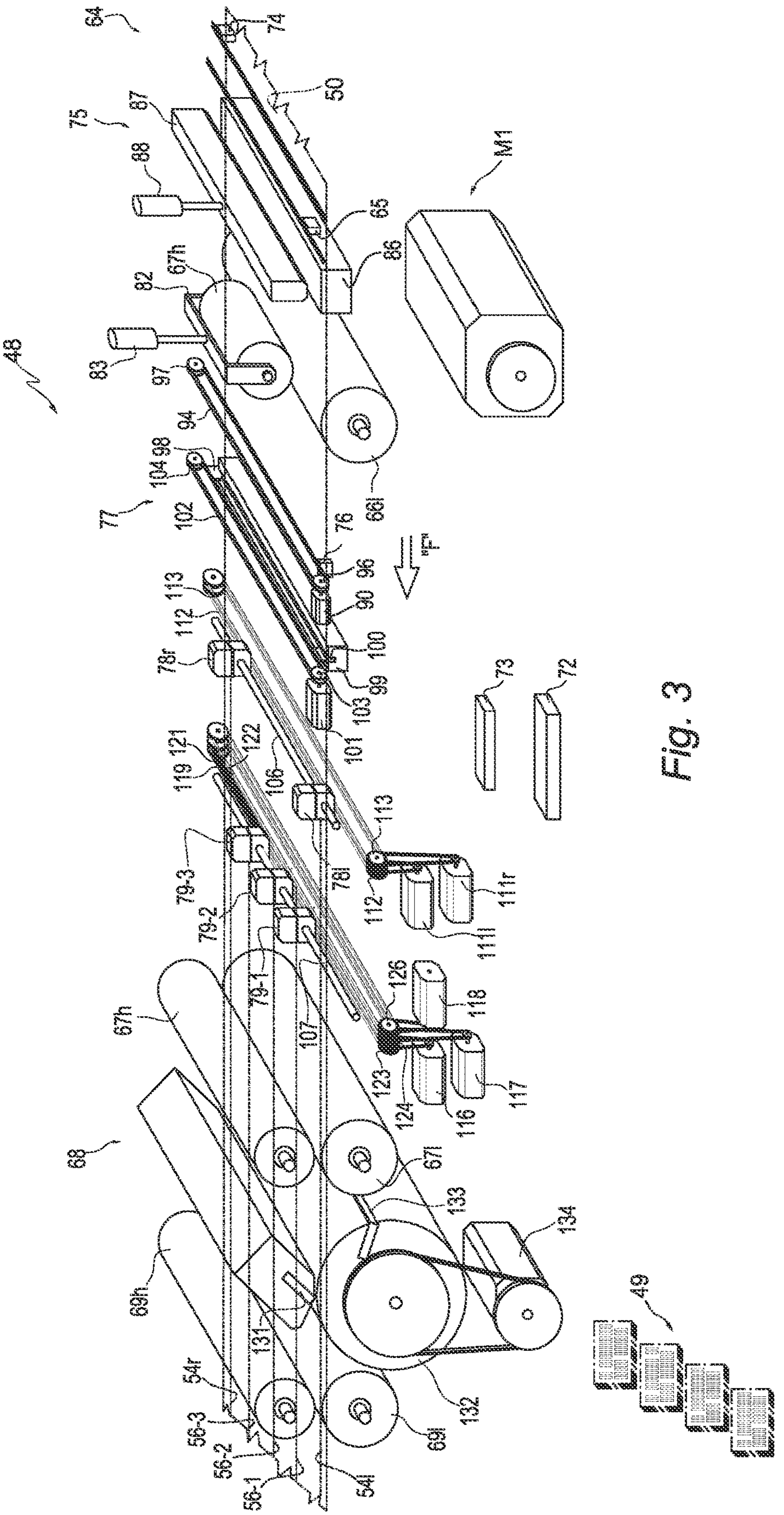
FIG. 3 is the view of FIG. 2 in an operating condition of the cutter.

In summary, the cutter 48 (FIGS. 1, 2 and 3) comprises, arranged one behind the other with respect to an input gate 64: a sensor 65 for the TOF mark 61, for example adjacent to a left side, an input feeding mechanism formed by a pair of superimposed input feed rollers 66*l* and 66*h* for the entering web 50, an intermediate feeding mechanism formed by a pair of superimposed intermediate feed rollers 67*l* and 67*h*, a transversal cutting device 68, a pair of lower and upper extraction rollers 69*l* and 69*h* for the separated sheets and a discard container 71. An electronic unit 72 controls the operation of the various components of the cutter 48 and an interface circuit 73 is provided for exchanging data with the printer 51.

According to the invention, the cutter 48 further comprises, at the input gate 64 and upstream of the input feed rollers 66*l* and 66*h*, a sensor device 74 for the 2D codes 63, for example adjacent to a right side. Downstream of the feed rolls, the cutter also comprises a sensor 76 for the Print mark 62 and a transversal sectioning group 77 and, upstream of the pair of intermediate feed rollers 67*l* and 67*h*, margining knives 78*l* and 78*r* and longitudinal dividing knives 79-1, 79-2 and 79-3.

The sensor 65 and the sensor device 74 operate by longitudinal scanning on the entering web 50, respectively, to identify the position of the TOF mark 61 and to recognize and decode the 2D codes 63. In turn, the sensor 76 operates by transversal scanning on the web 53 to determine the physical position of the inner edge of the Print mark 62, as a reference for the positions of the margining knives 78*l* and 78*r* and the longitudinal dividing knives 79-1, 79-2 and 79-3.

The sensor 65 for the TOF mark and the 2D code sensor 74 are transversally shiftable to take into account the positions assumed by the edges of the web 50, depending on the width of the web and the alignment condition with respect to the physical edges of the cutter. The positioning of the sensors 65 and 74 can be carried out manually jointly with the introduction of a new web. Alternatively, the sensor 65 and the sensor device 74 can be moved automatically by corresponding servomechanisms, not shown, which are servo-controlled with positions detected by the physical edges of the web 50 and on control of the electronic unit 72, in accordance with known techniques.

The input feed rollers 66*l* and 66*h* and the intermediate feed rollers 67*l* and 67*h*, in a steady state, operate in synchronism to jointly drive the web 50 to the input gate 64 and to feed the transversal cutting device 68. In particular, the lower rollers 66*l* and 67*l* are driven by a motor M1 controlled by the electronic unit 72 by means of motion transmission mechanisms not shown in the drawings, while the upper rollers 66*h* and 67*h* are pressure rollers for engaging the web 50 with the motorized rollers 66*l* and 67*l*.

In the input feed rollers, the pressure roller 66*h* is rotatably mounted on a frame 82 with the possibility of approaching/moving away from the roller 66*i* by means of an actuator 83. Conveniently, the electronic unit 72 controls the actuator 83 for switching the input feed rollers between an activated condition wherein the roller 69*h* presses the roller 69*l* for driving the entering paper web 50 and an deactivated condition wherein the roller 69*h* is disengaged from the roller 69*l* without dragging the web.

The braking device 75 is provided for arresting the entering web 50 at the input gate 64 of the cutter 48 in the deactivated condition of the input feed rollers 66*l,h*. In particular, the braking device 75 comprises a fixed transversal bar 86 arranged, in tangential condition, under the path of the web 50 and a transversal braking bar 87 above the path of the web. The braking bar 87 is connected to an actuator 88 controlled by the electronic unit 72 in order to push the entering web against the bar 86 with a consequent stopping action on the web.

For the transversal scanning, the sensor 76 is mounted on a carriage which is shiftable transversally with respect to the web 50 by a mechanism comprising a servo motor 90 controlled by the electronic unit 72, a toothed drive belt 94, a drive pulley 96 and a drive pulley 97. The belt 94 is elongated and is stretched between the pulleys 96 and 97, above the path of the web 50. The servomotor 90 is designed to rotate the drive pulley 96, by moving the sensor carriage 76, via the belt 94, for a scanning run between a rest position, to the left of the web path 50, and an end of run at the right of that path.

The mechanisms for automatically positioning the sensor 65 and the sensor device 74, if present, may be of the same type as the mechanism used for positioning the sensor 76.

The transversal sectioning group 77 has the function of cutting the paper web 50 between the last sheet of a given working section WS, a possible empty section and the Header page 58 of a subsequent working section WS. By way of example, the sectioning group 77 comprises a sectioning knife 98, a bar 99 defining a guide slot 100 for the knife 98, and an actuation mechanism for the knife 98 including a servomotor 101, a toothed drive web 102, a drive pulley 103 and a return pulley 104.

The bar 99 is arranged, in a tangential condition, below the path of the web 50 while the toothed belt 102, of an elongated type, is stretched between the pulleys 103 and 104 above the bar 94 parallel to the slot 100 and with an extension greater than the width of the web 50. The servomotor 101 drives the drive pulley 103, upon control of the electronic unit 72, for a transversal cutting run of the sectioning knife 98 between a rest position outside the path of the web 50, for example to the right of the right edge, and an end of run to the left of the left edge.

The margining knives 78*l* and 78*r* and the longitudinal dividing knives 79-1, 79-2 and 79-3 are of a rotary disc type, mounted on respective supports: The margining knives 78*l* and 78*r* are rotated by a drive shaft 106, with possibility of transversal sliding, while the dividing knives 79-1, 79-2 and 79-3 are slidably rotated by a drive shaft 107 mounted downstream of the drive shaft 106. The drive shafts 106 and 107 are also rotated by the motor M1 by means of a kinematic chain not shown in the drawings.

The supports of the margining knives and longitudinal dividing knives can be positioned along the respective drive shafts by servo-mechanisms controlled by the electronic unit 72, for example by means of pulleys and toothed belts.

Specifically, the supports of the margining knives 78*l* and 78*r* are shifted by servomotors 111*l* and 111*r* which are operative on a pair of toothed belts 112 and 113, by respective driving pulleys 114 and 115 and non-numbered return pulleys. The belts 112 and 113 are of the elongated type, stretched between the drive pulleys and the return pulleys above and outside the path of the web 50.

The supports of the longitudinal dividing knives 79-1, 79-2 and 79-3 are shifted by servomotors 116, 117 and 118, operating on toothed belts 119, 121 and 122 by means of respective driving pulleys 123, 124 and 126 and, not numbered, return pulleys. The belts 119, 121 and 122 are also of the elongated type, stretched between the driving pulleys and the return pulleys and are mounted above and externally with respect to the path of the web 50.

The supports of the margining knives 78*l* and 78*r* are displaceable along the drive shaft 106 from respective rest positions, left and right outside the web path 50 to the operating positions for the trimming cuts 541 and 54*r*. In turn, the supports of the longitudinal dividing knives 79-1, 79-2 and 79-3 are shiftable along the drive shaft 107 from rest positions outside the path of the web 50, respectively to the left, one behind the other for the knives 79-1 and 79-2, and to the right of the path for the knife 79-3, to the operating positions for the longitudinal divisions 56-1, 56-2 and 56-3.

Conveniently, the longitudinal dividing knives 79-1, 79-2 and 79-3 can be double so as to separate from the web 50 corresponding strips astride the divisions 56-1, 56-2 and 56-3, including bleed. The distance between the cutting edges of each pair of knives corresponds to the spaces "Gu" between the images of the side-by-side sheets 57 defined between the sheet setting data.

Flexible suction pipes (not shown) may be associated with the double knives to receive and send in a discard container the strips separate during the cutting phases, in a way known per se.

The intermediate feed rollers 67*l* and 67*h* feed the transversal cutting device 68, together with the input feed rollers 66*l* and 66*h*, with the web 50, in the activated condition of the input feed rollers and, alone, in the deactivated condition of these feed rollers.

The transversal cutting device 68 is of known type and, in summary, comprises a cutting unit formed by a fixed blade 131 and a blade-carrying cylinder 132 with a movable blade 133, arranged, respectively, above and below the path of the web 50. The blade cylinder 132 is rotated by a servomotor 134, controlled by the electronic unit 72, in synchronism with the movement of the web 50 and with a phase such as to perform the transversal cuts 55 of the sheets 57 and 58 and of the discards, in accordance with the sheet setting data.

The extraction rollers 69*l,h* provide to extract the separated sheets and send them to other devices for further movement: The upper roller 69*h* is a pressure roller for the web 50, while the lower roller 69*l* is a driving roller and is rotated, through (not shown) kinematic mechanisms, by the motor M1.

A diverter (not shown), also controlled by the electronic unit 72, diverts the discards toward the container 71.

The transversal cutting device 68 may also comprise a second cutting unit (not shown) with another fixed blade and another blade-carrying cylinder for removing a transversal strip of web corresponding to the longitudinal separation space "Ps" between the sheets or between the side-by-side sheets according to a known technique.

In the on-line feeding with the printer 51, the cutter 48 separates the sheets 49 of the printed working sections WS from the same printer in execution of a respective work order.

In this embodiment of the invention, the cutter 48 is configured on the basis of the sheet setting data following reading of the 2D code printed by the printer 51 on the Header page 58.

In another embodiment of the invention, the cutter 48 can be driven directly by the printer 51 through the interface circuit 73: the sheet setting data are then obtained jointly with the receipt of the Header page 58 or at the beginning of a new working section WS.

Alternatively, the cutter 48 can be fed off-line from the printer, by means of an unwinding device (not shown) with the paper web 50 unwinding from a reel of web wherein the previously printed sheets of working sections WS have been wound. The web 50 will include, for each working section, the corresponding 2D code in each Header page 58 and the cutter will operate based on the settings obtained from the reading of such code. The buffer 53, for compensating for the speed of the web 50, necessary in the case of on-line operation with the printer, is optional in off-line operation.

The operation of the cutter 48 is as follows:

An initialization step provides a rest condition in which: The motor M1 is stationary; the braking device 75 and the input feed rollers 66*l,h* are deactivated; the sectioning knife 98, the margining knives 78*l*, 78*r* and the longitudinal dividing knives 79-1,3 are in their respective rest positions, out of the path for the web 50; the transversal cutting device 68 is deactivated and the discard container 71 is arranged to receive the web emerging from the extraction rollers 69*l,h*.

The operator now inserts an empty section of the web 50 upstream of the working section WS between the bars 86 and 87 of the braking device 75 and between the input feed rollers 66*l,h* up to the margining knives 78*l*, 78*r*. The operator also correctly positions the sensor 65 and the sensor device 74 for reading the TOF marks 61 and the codes 62 and starts the cutter The electronic unit 72, on the other hand, positions the sensor 65 and the device 74 automatically at, for a cutter 48 which is provided with servomechanisms for sensor and sensor device.

The electronic unit 72 now activates the motor M1 and controls the actuator 83 for the activated condition of the input feed rollers 66*l,h* and the rest position of the knives 98, 78*l,r* and 79-1,2,3.

Due to the action of the input feed rollers 66*l,h* and the intermediate feed rollers 67*l,h*, the paper web 50 advances through the transversal cutting device 68 and is collected as a waste by the discard container 71. Upon arrival of the working section WS, the sheet setting data is stored on passage of the 2D code 63, for the webs 50, which are provided with it, in front of the sensor device 74 with decoding by the electronic unit 72. The passage of the TOF mark 61 by the sensor 65 for synchronization operations is also detected.

If the presence of the Header page 58 is identified, the electronic unit 72 drives the actuator 83 by moving the roller 66*h* away from the roller 66*l* for to the deactivated condition of the input feed rollers 66*l,h*. The electronic unit also drives the actuator 88 of the braking device 75 with movement of the braking bar 87 against the bar 86, stopping the entering web 50. The intermediate feeding roller 67*l*, still active, temporarily slides along the web 50, keeping it under tension. The timing from the identification of the Header page is such as to advance the web by a portion carrying the Print mark 62 under the scanning area of the sensor 76.

In the case of direct reception of the sheet setting data from the printer 51, the electronic unit 72 stores the setting data and executes the other steps of the sequence, as for the reading of the 2D code, by advancing and stopping the web 50 and positioning the Print mark 62 under the scanning area of the sensor 76.

The servomotor 90 of the sensor 76 is now activated, with displacement of the relative carriage for the transversal scanning run and return to the rest position. After identification of the Print mark 62, the electronic unit 72 detects and stores the distance of the inner edge of the mark 62 from a physical margin of the cutter, as a reference for the positions of the margining knives 78*l* and 78*h* and the longitudinal dividing knives 79-1,2,3.

The electronic unit 72 also activates the transversal sectioning group 77, which drives the servomotor 101 to move the sectioning knife 98 along the slot 100 by means of the toothed belt 102. The knife moves from its rest position beyond the right edge of the web toward to the left edge of the web 50 and beyond, cutting off the empty web portion downstream of the bar 99. The sectioned empty portion, no longer retained by the braking device 75, is then advanced by the intermediate feed rollers 67*l,h* and diverted into the discard container 71, while the sectioning knife 98 is returned to its rest position. The electronic control unit 72 then activates the servomotors 111*l* and 111*r* and 116, 117 and 118 to position the margining knives and the longitudinal dividing knives based on the stored sheet setting data of the working section WS.

Upon completion of the positioning, the electronic unit 72, by means of the actuators 88 and 83, deactivates the braking device 75 and reactivates the pair of input feed rollers 66*l,h*, causing the entering web 50 to advance through the various operating components, with trimming by the margining knives 78*l,r*, longitudinal cuts by the dividing knives 79-1,3 and transversal cuts by the transversal cutting device 68 on the single sheets or on the side-by-side sheets 57 and page 58.

The Header page 58, the side-by-side sheets, if present, and the discards are hijacked into the container 71, while the separated sheets 57 of the working section WS are sent for stacking and other processes.

The cutting and separation of the sheets 57 continues until the last sheet of the current working section WS is recognized, or in response to information received from the printer indicating the need to slow down the web feed speed. Upon detection of the 2D code 63 on the Header page of a new working section WS, with different sheet setting data, or upon direct reception of such data from the printer 51, the electronic unit 72 deactivates the input feed rollers 66*h,l* and activates the braking device 75 and the transversal sectioning group 77.

While the intermediate feed rolls 67*l,h* continue to feed the transversal cutting device 68 for separating the last sheets 57 of the current working section, the electronic unit 72 activates the servomotors 111*l* and 111*r* and 116, 117 and 118 for positioning the margining knives and the longitudinal dividing knives on the basis of the sheet setting data of the 2D code of the new working section WS or from the printer, subsequently resuming the execution of divisions and cuts as in the initialization phase.

In the case of sheet setting data of the current working section WS equal to those of the previous section, there is no stop of the entering web 50 and the sheets 57 are separated as for the previous working section.

Figure 6:
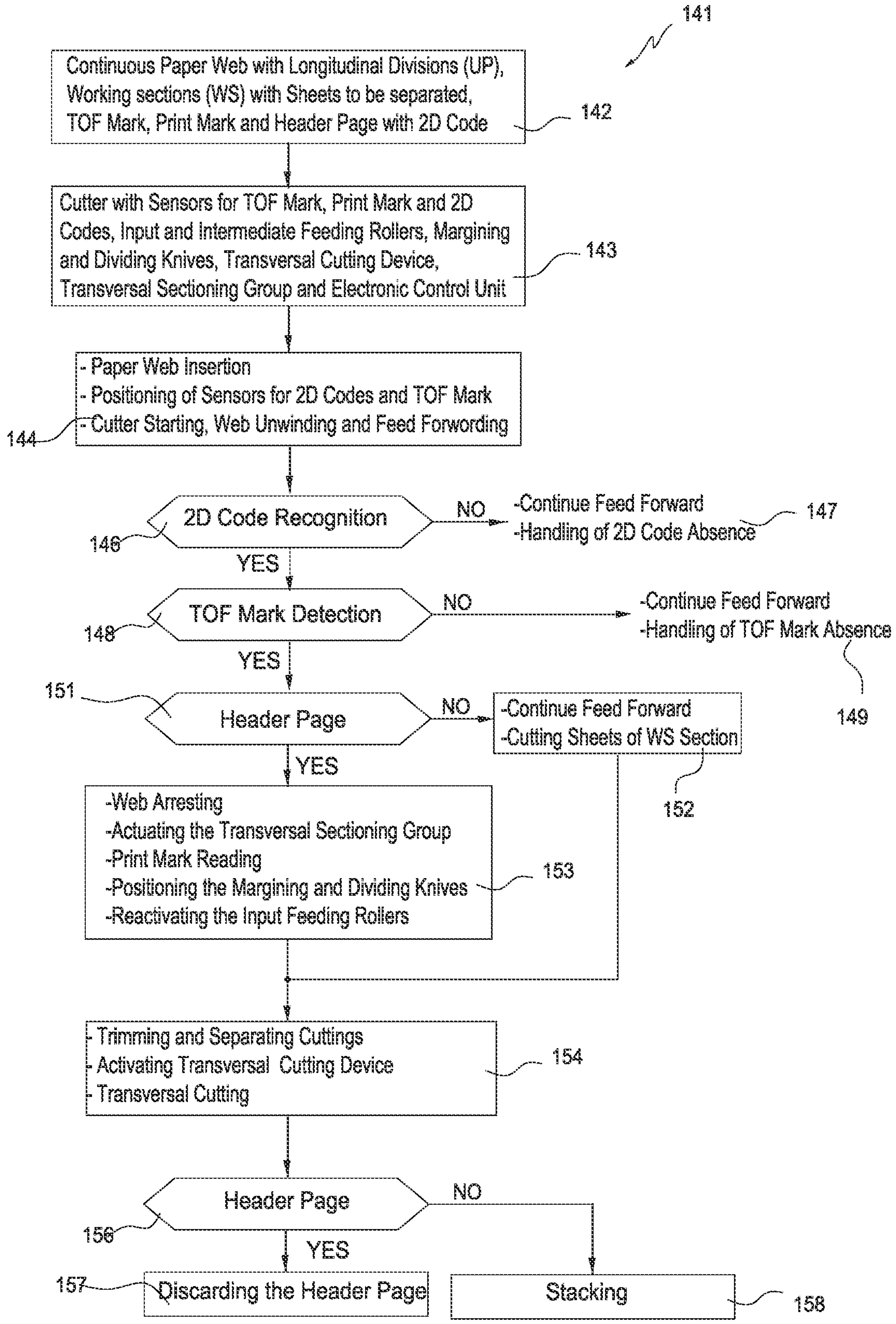
FIG. 6 is a simplified block diagram, in an initial step, of the separation method for sheets printed according to the invention.

The separation method for printed sheets for paper webs with 2D codes according to the invention is shown as 141 in FIG. 6.

In summary, with reference to the previously described structures, the method 141 involves, as a setup phase, block 142, the use of the continuous paper web 50 susceptible of longitudinal divisions 56, working sections WS with sheets 57 to be separated, TOF mark 61, Print mark 62 and Header page 58 with the 2D code 63 for the sheet setting data.

Block 143 shows the use of the cutter 48 with the sensors 63, 74 and 76 for the TOF mark, the 2D codes and the Print mark, the input feed rollers 66*l,h* and intermediate rollers 67*l,h*, margining knives 78*l,r* and dividing knives 79-1,3 with the possibility of transversal positioning, transversal sectioning group 77, the transversal cutting device 68 and the electronic control unit 72. Finally, block 144 highlights the manual insertion of the paper web 50, the transversal positioning of the sensors 63, 74 and the starting of the cutter, and the activation of the input feed rollers 66*l,h* together with the unwinding of the web.

In a block 146 the presence of the 2D code and its decoding are checked. In the negative case, block 147, the web 50 is fed forward, with the cutter stopping in the event of prolonged absence beyond a predetermined delay. In the case of code recognition, the search for the TOF mark, block 148, is continued.

In absence of recognition of the TOF mark 61, block 149, the advancement of the web 50 is continued and a possible stop is made. In the case of recognition, the presence of the Header page 58 is checked in a block 151. In the event of absence, block 152, the method proceeds with the advancement of the web and the cuts in the set positions.

The recognition of the Header page, block 153, starts the settings for the section WS, with: Arrest of the web 50, with the intermediate rollers 67*l,h* activated; detection of the Print mark 62 by means of the sensor 76; activation of the transversal sectioning group 77 with cutting of the web and advancement of the sectioned web; positioning of the margining knives 78*l,r* and dividing knives 79-1,2,3 in the space which has been freed after the sectioning of the web, and reactivation of the input feed rolls 66*l,h*.

Both in the case of presence and absence of the Header page are carried out in block 154: the trimming and separation cuts; insertion of the web into the transversal cutting device by means of the intermediate feeding rollers and activation of the transversal cutting device with transversal cutting of the sheets.

In block 156, the method checks if the sheet or sheets are Header page. If so, the Header page and the side-by-side sheets are discarded, block 157, while, if not, further stacking movements are carried out, block 158. After the start-up phase, the cutter 48 does not require any other intervention of the operator for carrying out the separation of sheets of a new working section WS of the current web.

Figure 7:
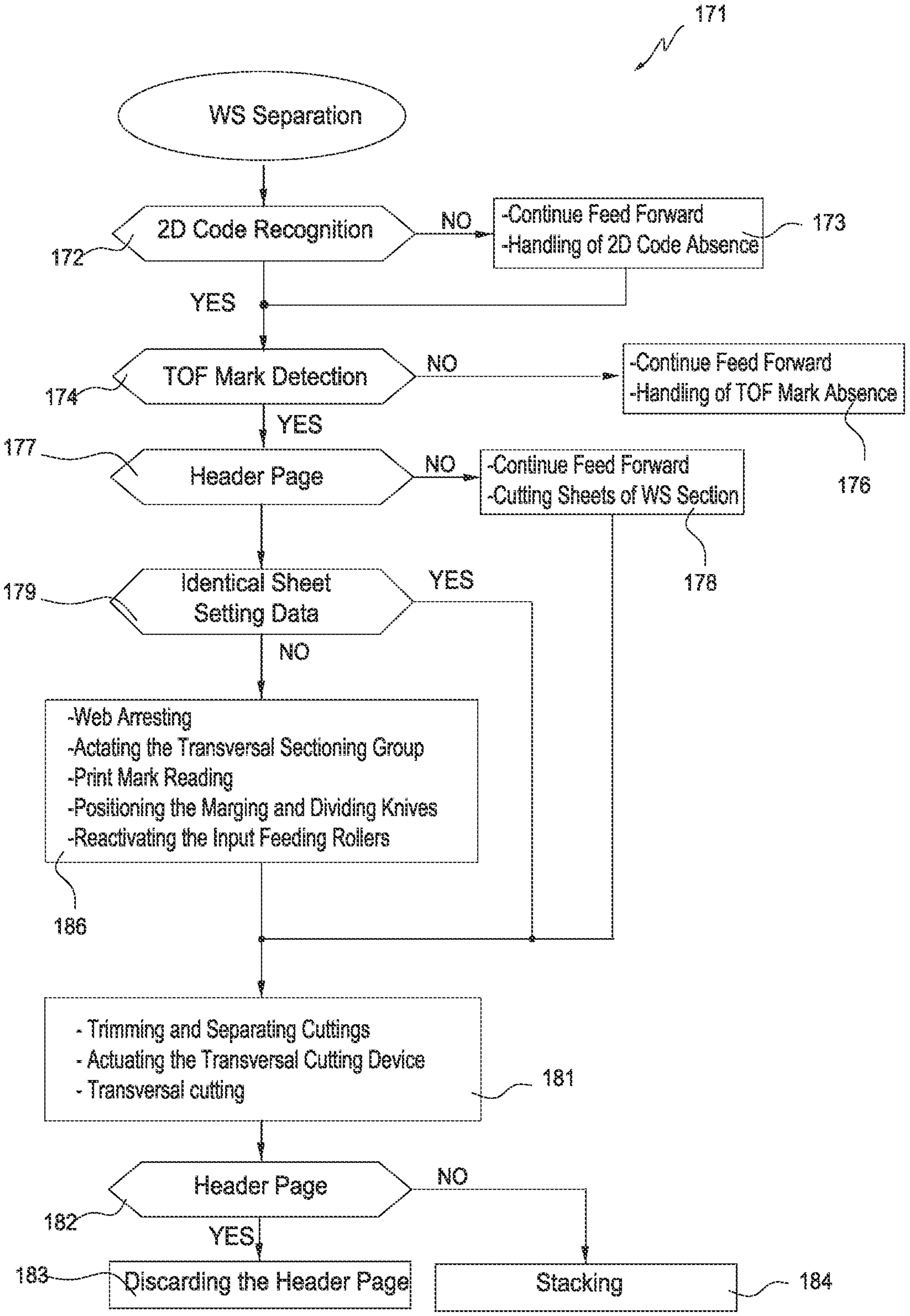
FIG. 7 is a simplified, steady-state block diagram of the separation method for sheets printed according to the invention.

In summary, with reference to what has been described above and to FIG. 7, the sheet separation method 171 provides, in steady state and in analogy with the separation method 141, in a block 172 the control of presence and decoding of the 2D code. In the negative case, block 173, the advancement of the web 50 and the eventual stop of the cutter is continued. The recognition of the code, gives rise to the search of the TOF mark 61, fork block 174. In the absence of recognition, block 176, the advancement of the web is continued and a possible stop is made. If the TOF mark is recognized, it checks at the block 177 if the Header page 58 is present. In case of absence, block 178 is carried out with the advancement of the web and with the trimming and separation cuts in the already set positions.

If the Header page 58 is present, the method checks at block 179 if the sheet setting data of the new code are identical to those of the preceding WS section.

In case of identity, in block 181, the trimming and splitting cuts and the transversal cuts of the sheets are started according to the preceding settings. The next steps of block 182 are then carried out to check the presence of the Header page and to blocks 183 and 184 for the discard of the Header page and the stacking of the sheets.

If the sheet setting data of the new 2D code are different from those of the preceding section WS, in a manner similar to the block 153 of FIG. 6, the steps of stopping the web 50 are carried out in block 186; Print mark reading by means of the sensor 76, activation of the transversal sectioning group 77 with cutting of the web; positioning of the margining knives 78*r, l* and dividing knives 79-1, 3 and reactivation of the input feed rolls 66*l, h*.

After the new setting, the method returns to the step of block 181 and the following steps with the separation of the sheets according to the settings of the new section WS.

From what has been described and illustrated above, it is clear that:

the margining knives and longitudinal cutting knives can be displaced transversally along areas free from the web after stopping and transversal sectioning of a new working section;

for a new working section, the electronic unit is designed to detect the transversal position of the Print mark; and in response to the detection of new setting data of a new working section, the electronic control unit is designed for:

a) deactivating the input feeding mechanism with stop of the entering web;

b) activating the transversal sectioning unit, separating the new working section from the current working section, c) activating or maintaining activated the intermediate feeding mechanism for the transversal cuts of the individual sheets or side by side sheet of the current working section;

d) activating the knife shift servomechanisms to arrange the margining knives and the longitudinal dividing knives in transversal positions based on the setting data of the new working section, referred to the position of the Print mark; and e) re-activating the input feeding mechanism for the entering web; and executing the longitudinal divisions and transversal cuts on the cut sheets or side-by-side sheets of the new working section based on the new sheet setting data.

The transversal-scanning sensor is displaceable by a mechanism including a servo motor controlled by the electronic unit, a toothed drive web, a drive pulley and a drive pulley and wherein the toothed belt is transversally extended. stretched between the drive pulley and the idler pulley and the servo motor is designed to rotate the drive pulley, moving the sensor, via the drive web. The web has a graphic mark at the top of the sheet (TOF Mark) at each single sheet or at each side by side sheet. The separation method is implemented by a cutter comprising a TOF mark sensor, an input feeding mechanism, an intermediate feeding mechanism and a transversal cutting device for separating the individual sheets or side by side sheets and wherein the electronic unit:

e) preliminarily to step a), detects from the entering web the position of the TOF mark;

f) preliminarily to step b), deactivates the operation of the input feeding mechanism and stops the entering web, keeping the intermediate feeding mechanism activated;

g) jointly with step b), completes the transversal cuts of the single sheets or side by side sheets of the current working section; and, h) preliminarily to step c), it reactivates the feeding of the entering web.

In the printed web, each sheet or side by side sheet has a graphic top of sheet mark (TOF mark) outside the respective print area for text and/or images and the cutter comprises a sensor for the TOF mark, for controlling the transversal cutting device.

The sheet setting data of the 2D code sheets includes: Web Width, Page Length, Number of longitudinal overlap (UPs) of the web, Width of each overlap (WUP), Bleed (Bleed), and wherein the positioning data for the margining knives and longitudinal dividing knives are determined by an algorithm comprising: The web width, the number of longitudinal overlaps (UP), the width of each overlap (WUP) and bleed (Bleed).

Naturally, the principle of the invention remaining the same, the embodiments and details of construction may be varied widely with respect to what has been described and illustrated purely by way of non-limiting example, without thereby departing from the scope of the present invention.

For example, the input feeding mechanism and the intermediate feeding mechanism may be different from the rollers shown and/or may be fed independently of each other so as to avoid the use of the braking device.

As an alternative to the sensor 76 with mechanized transversal scanning, the transversal position of the Print mark can be detected by an electronic sensor with CIS or CCD scanning technology, of known type, even without stopping the web.

At the beginning of the working sections WS, the Header pages can be repeated or absent altogether.

Upon command of the printer 51, the cutter 48 may be subjected to deceleration steps at the end of the cuts of the working sections WS and advancement of the web at reduced speed for a reduction of the waste of web in the format change and to acceleration steps during the splits.

Moreover, under operating conditions, the speeds of the printer and of the cutter may be temporarily different to ensure that the buffer 53 is emptied from the loaded web and returned to optimum working conditions.

With the modifications of the case, the Print mark and the sheet start mark (TOF) can be constituted by a single mark associated both with the definition of the sheet start and with the transversal position of the printing area readable by a suitable cutter sensor.

The Print mark for the reference positioning of the margining knives and longitudinal cutting knives can also be used in cutters (not shown) which do not require the stopping of the web and the sectioning between working sections WS having different characteristics for the movement of the knives.

This may be the case in which the discs and the rotating counter-discs of the margining and separation knives are slidably and synchronously carried by parallel drive shafts having the possibility of approaching/moving away between engagement and disengagement configurations.

In the engagement configurations, the rotating disks are in interference with the counter-disks for the web separations, while the rotating disks are spaced away from the counter-disks, leaving the entering web free, in the disengagement configuration.

For this type of cutter, the web can provide a suitable empty section and/or with the various graphic marks and with the 2D code between one section WS and the next one. The reading of the marks and of the 2D code and the positioning of the knives are carried out "on the fly" with the web moving and the length of the empty section is calculated for a sliding time such as to allow the change of configuration and the transversal movement of the knives between a section WS and the next one.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A longitudinal and transversal separation cutter for sheets printed from an entering continuous paper web, on unwinding, wherein said web is susceptible of longitudinal divisions and defines different working sections with a series of single sheets or side-by-side sheets to be separated, the sheets have a respective print area with texts and/or images and said cutter comprises margining knives and longitudinal dividing knives which can be positioned transversally on the basis of sheet setting data of a respective working section and an electronic control unit, wherein said cutter is designed for operating with paper webs wherein, on a top of each working section, a print mark is printed at a predefined transversal distance from a given lateral margin of the respective print area, said separation cutter further comprising shifting servomechanisms for the margining knives and the longitudinal dividing knives and a transversal scanning sensor for the print mark and wherein, for a new working section, said electronic unit is constructed and arranged for:

detecting the transversal position of the print mark by means of the transversal scanning sensor;

activating the servomechanisms by arranging the margining knives and the longitudinal dividing knives in transversal positions corresponding to the sheet setting data of the new working section and reference to the transversal position of the print mark;

executing the longitudinal and transversal separations on the single sheets or on the side-by-side sheets of the new working section based on the new sheet setting data; and an input feeding mechanism for the entering web; a transversal sectioning group, upstream of the margining knives and the longitudinal dividing knives, for a transversal sectioning of the new working section; and an intermediate feeding mechanism for the transversal cutting device, said cutter operates with paper webs wherein each single sheet or each set of side by side sheet has a graphic top-of-form (TOF) mark of control for the transversal separation of the sheets, said cutter also comprises, at an inlet, a sensor for the TOF mark and wherein the transversal scanning sensor is arranged upstream of the transversal sectioning group and downstream of the sensor for the TOF mark.

2. Separation cutter according to claim 1 wherein said print mark is printed adjacent to an upper margin and to a given lateral margin of the web in an area intended to be removed with trimming cuts.

3. Separation cutter according to claim 1 further comprising an input feeding mechanism for the entering web, a transversal-cutting device for the transversal separation of the sheets and an intermediate feeding mechanism for the transversal-cutting device, the input feeding mechanism includes a pair of input feed rollers with a pressure roller and a drive roller, and the pressure roller is susceptible of movement between an engagement position with the motor roller for dragging the entering web and a disengagement position, of deactivation for the dragging of the web, and wherein said cutter also includes, an actuator for the pressure roller and a braking device for the web, arranged upstream of the input feed rollers, the input rollers and the intermediate feeding mechanism are synchronized with each other, and wherein, for deactivating the pair of input rollers and arresting the entering web, the electronic control unit operates on the actuator for the pressure roller and on the braking device.

4. Separation cutter for printed sheets according to claim 1, wherein the transversal scanning sensor is movable, on control of the electronic unit, for a scanning run which is transversal with respect to the path of the web.

5. Separation cutter for printed sheets according to claim 1, wherein the transversal scanning sensor is of an electronic type.

6. Separation cutter for printed sheets according to claim 1, wherein said cutter is operatively arranged downstream of a printer, said printer provides for each working section a data block including the sheet setting data and wherein said cutter has an interface with the printer for obtaining the sheet setting data from the data block of the printer.

7. A method for longitudinal and transversal separating printed sheets for the separation cutter according to claim 1, wherein said method provides the following steps:

a) detecting the transversal position of the print mark by means of the transversal scanning sensor;

b) activating the shifting servomechanisms by arranging the margining knives and the longitudinal dividing knives into transversal positions corresponding to the sheet setting data of the new working section and reference to the transversal position of the print mark;

c) executing the longitudinal divisions on the single sheets or on the side-by-side sheets of the new working section on the basis of the new sheet setting data; and d) activating the transversal cutting device for the transversal cutting of the sheets.

8. The method according to claim 7, wherein said method is provided for the use of paper webs wherein each working section is preceded by a header page, the sheet setting data are obtainable from a 2D code printed on the header page, and wherein the separation cutter includes a sensor device for reading the 2D code whilst the electronic control unit obtains the sheet setting data from the reading of the 2D code.

9. Sheet separation method according to claim 7, wherein the steps a) and b) are skipped for equal sheet setting data.

10. A longitudinal and transversal separation cutter for sheets printed from an entering continuous paper web, on unwinding, wherein said web is susceptible of longitudinal divisions and defines different working sections with a series of single sheets or side-by-side sheets to be separated, the sheets have a respective print area with texts and/or images and said cutter comprises margining knives and longitudinal dividing knives which can be positioned transversally on the basis of sheet setting data of a respective working section and an electronic control unit, wherein said cutter is designed for operating with paper webs wherein, on a top of each working section, a print mark is printed at a predefined transversal distance from a given lateral margin of the respective print area, said separation cutter further comprising shifting servomechanisms for the margining knives and the longitudinal dividing knives and a transversal scanning sensor for the print mark and wherein, for a new working section, said electronic unit is designated for:

detecting the transversal position of the print mark by means of the transversal scanning sensor;

activating the servomechanisms by arranging the margining knives and the longitudinal dividing knives in transversal positions corresponding to the sheet setting data of the new working section and reference to the transversal position of the print mark; and executing the longitudinal and transversal separations on the single sheets or on the side-by-side sheets of the new working section based on the new sheet setting data, said separation cutter can operate with paper webs wherein each working section is preceded by a header page including the print mark and the sheet setting data are obtained by a 2D code printed on the header page, said cutter further comprises, at the input, a sensor device for reading the 2D code and wherein the electronic control unit obtains the sheet setting data from the reading of the 2D code, said separation cutter, and further comprising an input feeding mechanism for the entering web, a transversal sectioning group, upstream of the margining knives and the longitudinal dividing knives, for a transversal sectioning of the new working section, and an intermediate feeding mechanism for the transversal cutting device, said cutter operates with webs wherein each single sheet or each set of side by side sheet has a graphic top-of-form (TOF) mark of control for the transversal separation of the sheets, said cutter also comprises, at an inlet, a sensor for the TOF mark and wherein the transversal scanning sensor is arranged upstream of the transversal sectioning group and downstream of the sensor for the TOF mark, and wherein the sensor for TOF mark and the sensor device for reading the 2D code have possibility of a motorized transversal movement depending on the width of the web and the positions of the margins of said web.

11. Separation cutter for printed sheets according to claim 10, wherein the sheet setting data of the 2D code sheets includes Web Width, Page Length, Number of longitudinal overlaps of the web (UP), Width of each overlap (WUP), Bleed (Bleed), and wherein positioning data for the margining knives and longitudinal dividing knives are determined by an algorithm comprising:

The web width, the number of longitudinal overlaps (UP), the width of each overlap (WUP) and bleed (Bleed).

* * * * *